United States Patent [19]

Bowling

[11] Patent Number: 5,746,261
[45] Date of Patent: May 5, 1998

[54] REMOTELY CONTROLLED STUMP CUTTER OR SIMILAR APPARATUS

[76] Inventor: John M. Bowling, 9376 Lincoln Way East, Orrville, Ohio 44667

[21] Appl. No.: 768,510

[22] Filed: Dec. 18, 1996

Related U.S. Application Data

[63] Continuation-in-part of Ser. No. 367,782, Dec. 29, 1994, Pat. No. 5,638,619.

[51] Int. Cl.$^6$ .................................................. A01G 23/06
[52] U.S. Cl. .................. 144/24.12; 37/302; 56/10.2 A; 144/356; 144/334
[58] Field of Search ........................ 144/24.12, 334, 144/356; 37/302; 241/101.74; 56/2, 10.2 A, 10.7, 10.8, 11.9, DIG. 15

[56] References Cited

U.S. PATENT DOCUMENTS

| | | | |
|---|---|---|---|
| 5,435,573 | 7/1995 | Oakford | 273/438 |
| 5,638,619 | 6/1997 | Bowling | 37/302 |

OTHER PUBLICATIONS

J.P. Carlton Company Div. D.A.F., Inc., titled "Stump Cutters".

Vermeer Manufacturing Company, titled "Solenoid Control for 665A Stump Cutter".

Schumann, titled "Safety in Remote Controls", (1989).

P.Q. Controls, Inc., titled "Multi–Link System A Single, Better Solution".

Hydro Electronic Devices, Inc., titled "Intelligent Control of Mobile Hydraulics . . . By Design".

Control Chief Corporation, titled "Radio and Infrare Remote Control Technology" (1995).

Control Bits Corporation, titled "Remote Control It's Not Just for TV Anymore:".

*Primary Examiner*—W. Donald Bray
*Attorney, Agent, or Firm*—Oldham & Oldham Co., L.P.A.

[57] ABSTRACT

The present invention is directed to an operator's station from which a user may control the operation of a stump cutter or machines wherein the operator's station comprises: a control panel including at least one machine control switch or actuator; a controller for receiving commands from the control panel and in turn causing a stump cutter or machine to implement the commands; and, a wireless coupling of the control panel to the controller which is only operative in a pre-determined zone or area.

23 Claims, 6 Drawing Sheets

REMOTELY CONTROLLED STUMP CUTTER OR SIMILAR APPARATUS

FIELD OF THE INVENTION

This application is a continuation in part of application Ser. No. 08/367,782 filed Dec. 29, 1994 which is now U.S. Pat. No. 5,638,619. This invention relates generally to a wireless remote control which is to be used in conjunction with a stump cutter or other item of machinery. More specifically this invention relates to a wireless remote control for a stump cutting apparatus which is only operable within a defined area or zone for user safety.

BACKGROUND OF THE INVENTION

In utilizing high speed cutting, drilling, grinding, or similar machines, such as stump cutting machines, it is very important that the operator be provided with a suitable operator's station from which to control the operations of the machine. The operator must have responsive controls, must have a good vantage point from which to view the machine operations, and must be provided with protection from various dangers including the danger of flying debris resulting from machine operations. Prior stump cutting machines have been provided with protective operator stations connected to the machine utilizing a swinging boom and a wired, hydraulic, or other similar connection to the machine being controlled. Such an arrangement gives an operator the ability to vary the position of the machine controls to more clearly and safely view the machine operations.

However, these prior operator stations are connected to the machine being controlled and therefore, the movement of the operator's station is limited. Also, due to the swinging nature of the boom, these prior systems often may not allow the machine operator to position the operator's station exactly where desired, especially in areas of heavy brush, trees, or when the stump cutter is located adjacent to a structure such as a house, barn, or a fence. In certain stump cutting situations, the stump to be removed may be adjacent to a house or similar structure, offering an obstructed view from many conventional operator angles and requiring the machine operator to be careful so as not to damage the nearby structure. In this situation, the operator must be able to choose a vantage point for operating the machine which allows him or her to see all movements of the machine, and often must be close to the cutting element or other active machine components.

Another prior system utilizes a hand-held portable control panel connected by wires to the machine being controlled. While this type of control panel does allow the machine operator to move around, the operator may not be able to get as close to the cutting operations as may be required because the operator has no protection from flying debris created by the machine's operation. Also, an operator concerned with avoiding flying debris may forget to ensure that the control wires do not become entangled in the moving components of the machine. Such an accident could result in equipment damage and more significantly, operator injury.

Despite attempts in the prior art, such as hand held portable control panels connected using wires or booms, an operator of the stump cutting or similar apparatus was still able to operate the machine and come within a danger zone in which the operator would not be protected from any type of flying debris. Not only is the operator able to come within the zone of danger but others working in conjunction with the operator are not protected but for their own attentiveness and that of the machine operator. Because of this anyone assisting the operator of the stump cutting apparatus could himself come within the zone of danger and be injured by flying debris or the apparatus itself.

Therefore, in light of the foregoing deficiencies in the prior art, the applicant's invention is herein presented.

SUMMARY OF THE INVENTION

It is an object of the present invention to provide an improved remotely controlled stump cutting apparatus.

It is a further object of the present invention to provide an improved remotely controlled stump cutting apparatus which is only operable in predetermined zones or areas It is a further object of the present invention to protect the user from dangerous and unhealthy conditions created by the stump cutting or similar apparatus while at the same time providing for maximum mobility of the user for efficient operation of the stump cutting apparatus.

The present invention is therefore directed to an operator's station from which a user may control the operation of a stump cutter or machine, wherein the operator's station comprises: a control panel including at least one machine control switch or actuator; a controller for receiving commands from the control panel and in turn causing a stump cutter or machine to implement the commands; and, a wireless coupling of the control panel to the controller which is only operative in a predetermined zone or area.

The preferred embodiment comprises a radio frequency transmitter or transceiver electrically coupled to the control panel of the operator's station which transmits information representative of the operator's input which is then received by the stump cutter or machine. Coupled to the stump cutter is a radio frequency receiver or transceiver which detects information transmitted from the operator's station, deciphers the command which the user wishes to implement, and then transfers this information to a control system interface. The stump cutter then receives the commands transmitted by the user through the control system interface thereby causing the stump cutter or similar apparatus to operate accordingly.

The preferred embodiment is configured to only allow the stump cutter to operate if commands from the operator's station are transmitted from within a safety zone. The control system interface receives incoming commands from the radio frequency receiver and based on the transmitted signals strength, determines the distance from the stump cutter at which the operator's station was actuated. As long as the operator's station is beyond a preset minimum distance from the stump cutter but within a preset maximum distance, the stump cutter will operate. If either the minimum or maximum set points are exceeded, the stump cutter will shut off and thereby require the user to reenter the safety zone and manually restart the stump cutter. For the safety of the user and anyone else in the vicinity, the stump cutter will not automatically resume operation upon the user bringing the operator's station back within the safety zone.

In another embodiment of the invention the stump cutter has radio frequency shields attached and positioned to it such that if the user transmits commands from the control panel from outside of the zone of safety, the radio frequency signals will be intercepted by the shields, preventing their reception and operation of the stump cutter. Once the user moves the control panel within the safety zone, the position of the radio frequency shields will no longer interfere with the transmission of the control panel signals allowing their reception and operation of the stump cutter. The user will have to manually restart the stump cutter for the already mentioned safety reasons upon reentering the safety zone.

In a further embodiment of the invention, a wireless communication coupling between the control panel and the stump cutting apparatus is accomplished through infrared emitters and detectors. The infrared detectors are positioned on the stump cutter so their angle of reception creates areas which signals can be received in and areas in which signals cannot be received in, corresponding to safety and danger zones.

These along with other objects and advantages of the present invention will become more readily apparent from a reading of the detailed description taken in conjunction with the drawings and the claims.

DETAILED DESCRIPTION OF THE INVENTION

Figure 1:
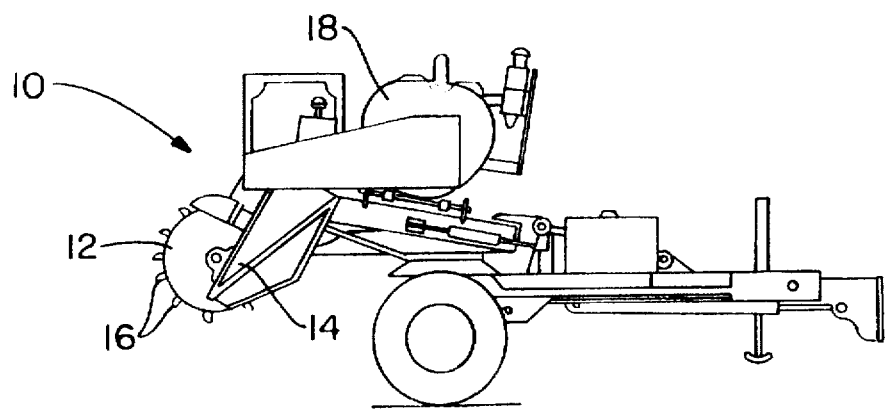
FIG. 1 is an elevational view of a stump cutter.

Reference will now be made in detail to the preferred embodiments of the invention, examples of which are illustrated in the accompanying drawings. Wherever possible, the same reference numerals will be used throughout the drawings to refer to the same or like parts.

Figure 2:
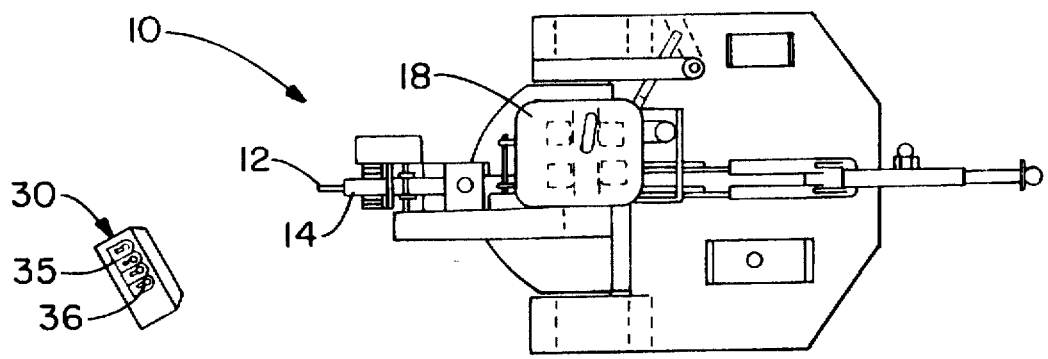
FIG. 2 is a top plan view of the stump cutter shown in FIG. 1.

Referring to FIGS. 1 and 2, a known stump cutter is shown generally at 10 and comprises a rotating cutting wheel 12 mounted on an end of a cutting boom 14. The cutting wheel 12 includes a plurality of radially extending cutting teeth 16 circumferentially secured about the periphery thereof; and, a power source such as a gasoline or diesel engine 18 for powering the cutting wheel 12. The illustrated stump cutter is a model manufactured and sold by Rayco Manufacturing, Inc. of Wooster, Ohio. The basic elements are representative of the general state of the art in stump cutters.

Operator's station 30 comprises a control panel 35 including a variety of control actuators 36 to be used by a machine operator to cause control panel 35 to generate control signals to be transmitted to the control system of stump cutter 10 such that upon receiving signals, stump cutter 10 performs operations as desired by the machine operator. For example, stump cutter 10 may include a hydraulic system for controlling the machine operations, and a control signal receiver for receiving control signals transmitted from operator's station 30. The control signal receiver of stump cutter 10 may be connected to a solenoid-actuated hydraulic valve bank of stump cutter 10 to control the flow of the hydraulic fluid to the various components of stump cutter 10.

Figure 3:
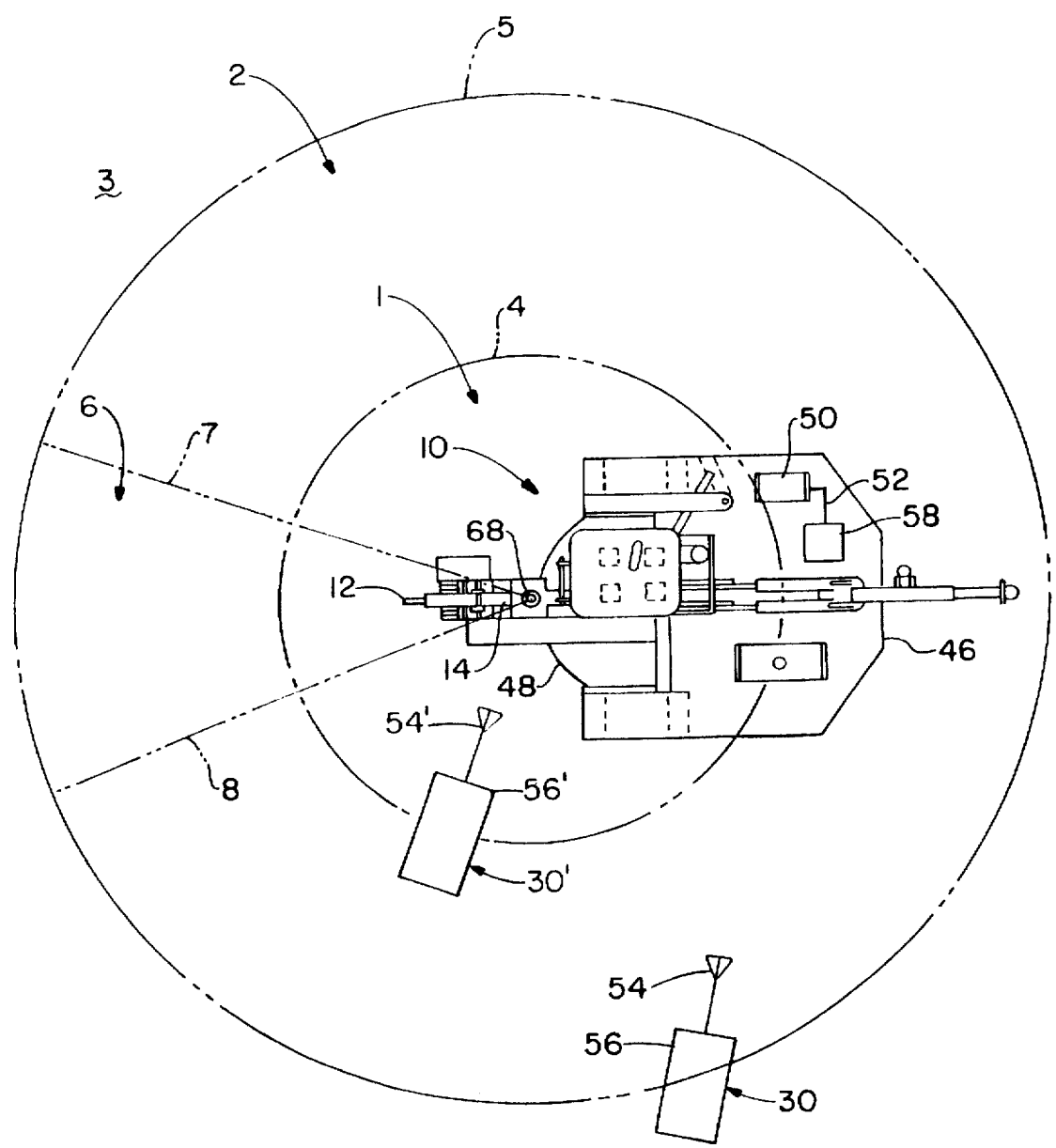
FIG. 3 is a top plan view of the preferred embodiment of the present invention.

The preferred embodiment of the present invention is shown in FIG. 3 and is comprised of stump cutter 10, operator's station 30, and a radio frequency wireless communications link. Stump cutter 10 is equipped with radio frequency (RF) receiver 50 (transceiver or transmitter/receiver), control system interface 58, and antenna 68. Antenna 68 is preferably mounted to cutting boom 14 which extends from the rear 48 of stump cutter 10. RF receiver 50 is electrically coupled 52 to control system interface 58 and both RF receiver 50 and control system interface 58 are physically mounted to stump cutter 10 in a convenient position, which happens to be near the front 46 of stump cutter 10. Although not shown, antenna 68 is electrically coupled to RF receiver 50 allowing radio frequency communications received by antenna 68 to be recovered by RF receiver 50.

Control system interface 58 translates information received from RF receiver 50 into electrical control signals which are then coupled to a solenoid actuated hydraulic valve bank (not shown) within stump cutter 10. The signals from control system interface 58 control the flow of hydraulic fluid to the various components of stump cutter 10 thereby controlling its operation. In addition operator's station 30 contains a radio frequency (RF) transmitter (transceiver or transmitter/receiver) 56 coupled to antenna 54.

Due to the inherent danger stump cutter 10 may present to a user, it is important to keep the user a safe distance from cutting wheel 12 and cutting boom 14 of stump cutter 10. To achieve this objective control system interface 58 constantly monitors the radio frequency signal's strength received from operator's station 30, in effect creating a proximity detector. If operator's station 30 is either to close or to far from stump cutter 10 control system interface 58 will cease all current and prevent any further operation of stump cutter 10.

Antenna 68 is situated on cutting boom 14 in order to maintain symmetrical safety zones about cutting boom 14, which is inherently the most dangerous part of stump cutter 10 due to its movement and cutting wheel 12 being attached to cutting boom 14. If antenna 68 were located on a fixed part of stump cutter 10, safety zones distances with respect to cutting boom 14 and cutting wheel 12 would vary during the side to side movement of cutting boom 14.

By using control system interface 58 as a proximity detector based upon radio frequency signal strength, a safety zone 2 is created surrounded by an inner danger zone 1 and an outer danger zone 3. Inner danger zone boundary 4 is represented in FIG. 3 by the smaller of the two dashed circles and outer danger zone boundary 5 is represented by the larger dashed circle. Stump cutter 10 will only operate when operator's station 30 is used from within safety zone 2. If operator station 30' is operated from within inner danger zone i all current and any further operation of stump cutter 10 will cease. Although not shown, the same is true if operator station 30' were to be used from within outer danger zone 3 or at a distance too far from stump cutter 10.

In the preferred embodiment, to prevent further operation of stump cutter 10 control system interface 58 shifts stump cutter 10's transmission into neutral thereby disengaging gasoline or diesel engine 18 from supplying power to rotating cutting wheel 12. In an alternate embodiment, rather than disengaging the power source from cutting wheel 12, gasoline or diesel engine 18 is actually turned off or shut down completely. In order to alert an operator that he has crossed the boundary out of safety zone 2, control system interface 58 will enable an audible alarm or buzzer and/or a visual indicator, both of which are disabled upon the operator re-entering safety zone 2.

To prevent injury to an operator, not only must the user be prevented from issuing commands to control stump cutter 10 outside of safety zone 2, but stump cutter 10 must cease any current operation upon a user leaving safety zone 2. To accomplish this, operator's station 30 and control system interface 58 of stump cutter 10 must maintain intermittent communication to allow control system interface 58 to continually determine and monitor the position of the operator.

In order to implement the intermittent communication described above, operator's station 30 will periodically send information to control system interface 58. If control system interface 58 fails to receive this information from operator's station 30 within predetermined intervals or periods of time, control system interface 58 will assume operator's station 30 has been removed from safety zone 2 and will cease all operations of stump cutter 10. It should also be appreciated that this sequence could be reversed in that control system interface 58, through RF transceiver 50 (transmitter), could periodically send information to operator's station 30. Operator's station 30 would receive the information through RF transceiver 56 (receiver). Upon receiving the signal, operator's station 30 would send control system interface 58 an acknowledgement signal. If control system interface 58 fails to receive the acknowledgement signal within a predetermined interval or period of time, control system interface 58 will cease all operations of stump cutter 10.

As a further preferred safety precaution, once stump cutter 10 is stopped or shut off due to operator's station 30 being outside of safety zone 2, the user is required to manually reactivate stump cutter 10. Simply reentering safety zone 2 will not automatically restart stump cutter 10. This feature is especially important to protect other workers in the vicinity of stump cutter 10 who may approach cutting boom 14 and cutting wheel 12 once operation ceases. Without this feature workers who approach cutting boom 14 could be seriously injured if the user controlling operator's station 30 was to suddenly reenter safety zone 2 thereby reactivating stump cutter 10.

This embodiment of the invention is particularly useful in that it allows stump cutter 10 to be operated from a position in which the operator can visually monitor the progress of stump cutter 10 in cutting and helping to remove tree stumps, but only from a safe distance.

Figure 4:
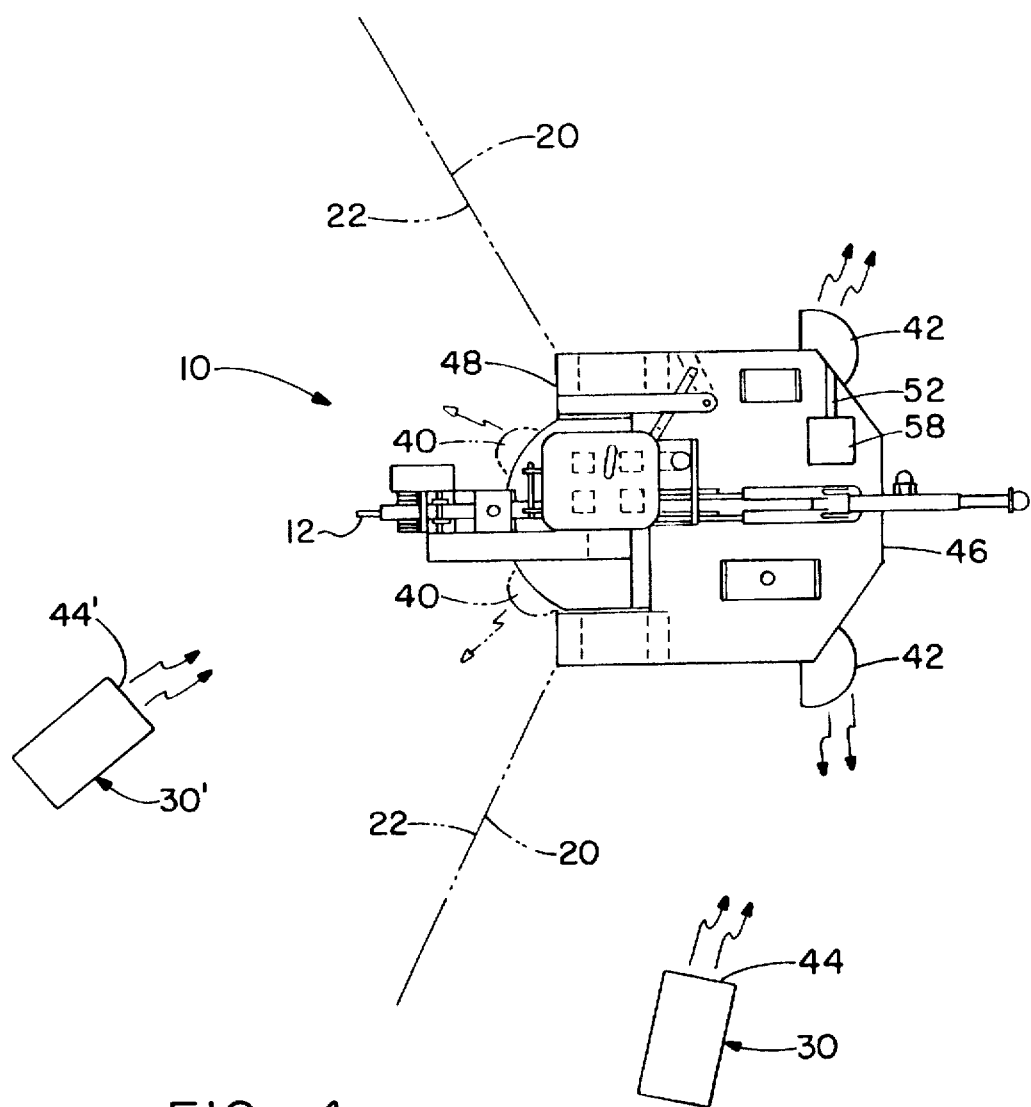
FIG. 4 is a top plan view of an infrared (IR) alternative embodiment of the present invention.

An alternative embodiment of the present invention is shown in FIG. 4 and is comprised of stump cutter 10, operator station 30, an infrared transmitter 44 contained within operator's station 30. Stump cutter 10 has two infrared receivers mechanically coupled to the front 46 of stump cutter 10 in predetermined positions. Infrared receivers 42 communicate received information to control system interface 58 through electrical coupling 52.

Two dashed lines extending diagonally from the rear 48 of stump cutter 10 are representative of the boundaries between stump cutter 10's danger zone 22 and safety zone 20. Danger zone 22 is the area shown in FIGS. 4 and 5 to the left of both dashed lines and containing cutter boom 14, with safety zone 20 being the area to the right of both dashed lines. To increase safety and prevent operation of stump cutter 10 from within danger zone 22, infrared receivers 42 are physically mounted to stump cutter 10 in predetermined positions which limit the angle of reception of the infrared receivers 42. Because infrared communication employs light as the medium of information transfer, infrared receivers 42 will only receive information sent by transmitter 44 from operator's station 30 when operator's station 30 is used within a limited area. If the user moves out of the safety zone 20 and into danger zone 22, operator's station 30 will be outside the limited operable area for reception by infrared receivers 42. Infrared transmitter 44 will fail to communicate with infrared receivers 42 preventing further operation of stump cutter 10. Again, this embodiment provides redundant feedback to control system interface 58 depending on the operator's location whether within safety zone 20 or danger zone 22.

FIG. 4 also shows an alternative embodiment of stump cutter 10 comprising two optional infrared receivers 40 coupled to the rear 48 of stump cutter 10 within danger zone 22. As described earlier and not shown again, infrared receivers 40 are both coupled to control system interface 58 through electrical coupling 52. This arrangement of infrared receivers in both the safety zone 20 and the danger zone 22 provide a constant positive indication of the operator's position. Instead of relying upon infrared transmitter 44 falling outside of the limited reception area for infrared receivers 42 to indicate the operator has entered danger zone 22, infrared receivers 40 are positioned to receive information from infrared transmitter 44' whenever operator's station 30' is operated from within danger zone 22. By depending upon a greater number of infrared receivers, control system interface 58 is less susceptible to false or incorrect signals which could be caused by any number of reasons, particularly by failure of any components of stump cutter 10.

In addition to the redundant user location information provided, infrared receivers 40 may be programmed to allow for limited operation within danger zone 22 but only when operators station 30' is at a safe distance from cutting wheel 12 and cutting boom 14. To implement this function, control system interface 58 monitors the strength of the information signal set points received by infrared receivers 40 and based on predetermined signal strengths either allows or prevents operation of stump cutter 10. As an operator carries operator's station 30' within danger zone 22 but away from the front 48 of stump cutter 10, the infrared communications medium decreases in signal strength. As long as infrared transmitter 44' is being operated within danger zone 22 and the received signal strength at infrared receivers 40 is above the predetermined setpoint, control system interface 58 will prevent operation of stump cutter 10. As a user moves operator's station 30' further away from stump cutter 10 within danger zone 22, control system interface 58 will permit stump cutter 10 to operate once it has detected signal strength drops below the predetermined setpoint.

Figure 5:
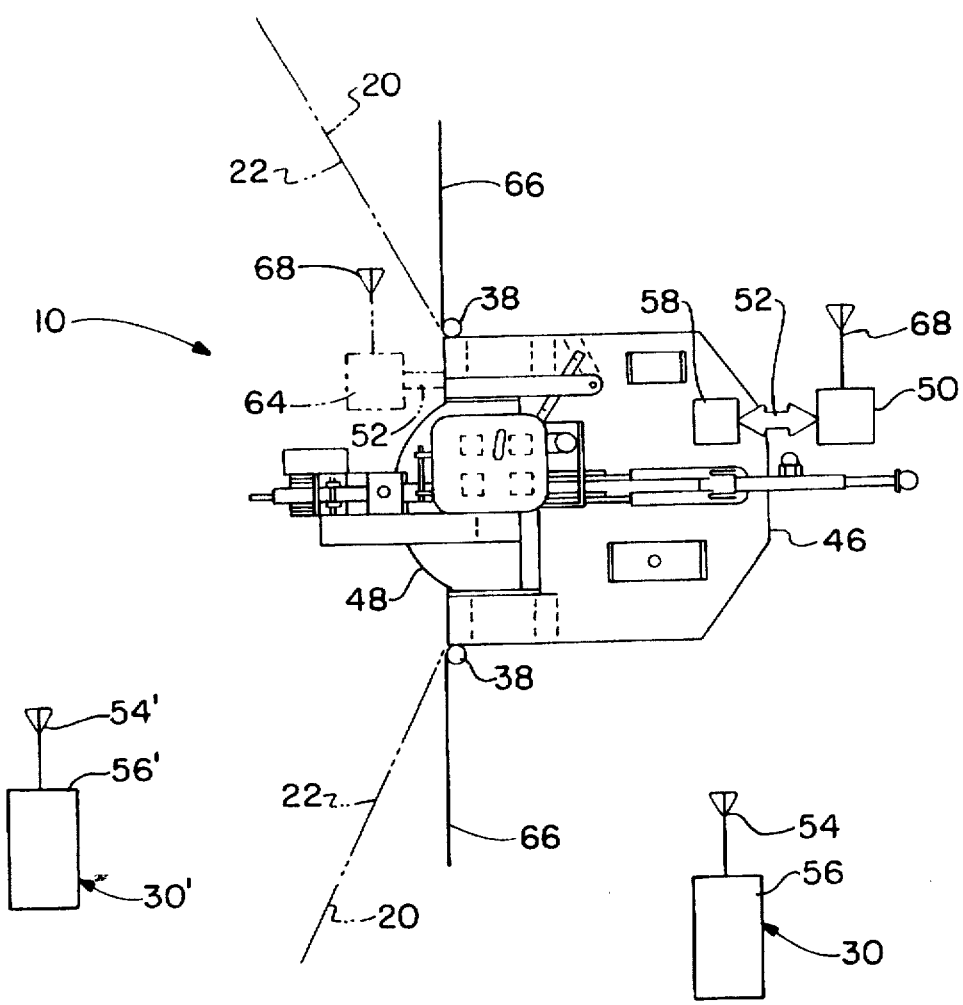
FIG. 5 is a top plan view of a second radio frequency (RF) alternative embodiment of the present invention.

An alternative embodiment using radio frequency is shown in FIG. 5. Operator's station 30 contains a radio frequency (RF) transmitter 56 coupled to antenna 54. Stump cutter 10 is electrically and mechanically coupled to control system interface 58 in a similar manner as that described earlier, but central system interface 58 is now electrically coupled to RF receiver 50, whose circuitry is coupled to antenna 68. Similar to the infrared embodiment described earlier, an additional RF receiver 64 may be mechanically and electrically coupled to the rear 48 of stump cutter 10 in addition to or in lieu of RF receiver 50, which is coupled to the front 46 of stump cutter 10. This again allows for redundant feedback to control system interface 58 depending on the operator's location whether within safety zone 20 or danger zone 22. The ability to operate stump cutter 10 from within danger zone 22 but only at a predetermined safe distance from the front 48 again can be implemented by control system interface 58 monitoring radio frequency signal strength of the received information from RF transmitter 56'. The information is broadcast through antenna 54' which is received by antenna 68 and RF receiver 64.

While infrared communications is "line of sight" in that light is emitted and then detected along a straight line, radio frequency communication is not so limited and broadcasts information in all directions. Because of this wide area of broadcast, limited area operation of stump cutter 10 from operator's station 30 presents difficulties not present in the prior infrared embodiment of the invention. In order to implement limited area operation of stump cutter 10 via radio frequency, stump cutter 10 further includes RF shields 66 which are coupled to stump cutter 10 by hinges 38 or other means commonly known in the art. RF shields 66 are positioned near the rear 48 of stump cutter 10 in a predetermined fashion which prevents radio frequency signals from being received by RF receiver 50 if transmitted from RF transmitter 56'. RF shields 66 also prevent RF receiver 64 from receiving signals transmitted from RF transmitter 56 within safety zone 20.

Radio frequency shields 66 can be constructed of any type of conductive material known in the art which when grounded to either stump cutter 10's chassis or earth ground, will act as an effective antenna thereby receiving transmitted radio frequency signals and shunting the signals to ground and preventing any further signal travel. Such materials include, but are not limited to, sheet metal, fencing, chicken wire, steel grating or any other highly conductive surface. In the embodiment shown in FIG. 5, RF shields 66 are comprised of steel grating, which is highly conductive and also provides further physical shielding of the operator from flying debris, further adding to the operator's safety when located within safety zone 20.

Figure 6:
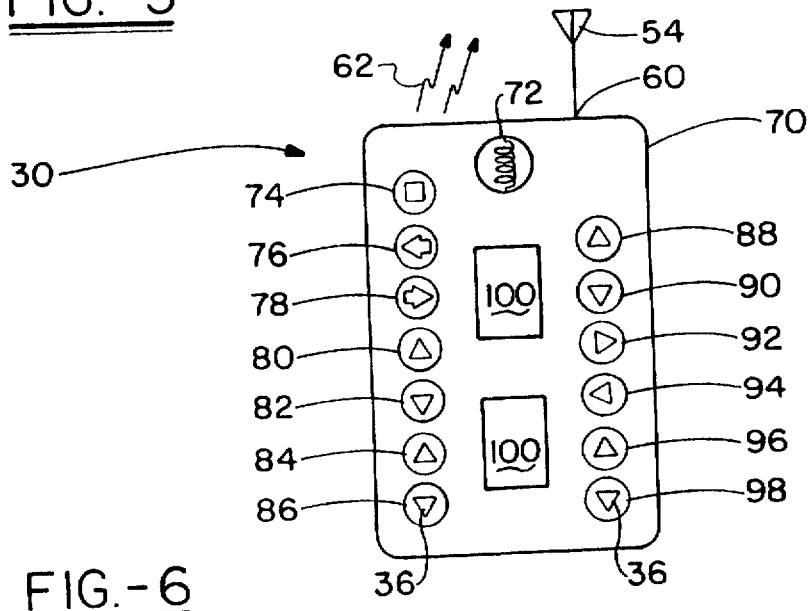
FIG. 6 is a top plan view of the preferred embodiment of the operator's station.

FIG. 6 shows the preferred embodiment of operator's station 30 in more detail. Operator's station 30 is comprised of enclosure 70, RF communications link 60, antenna 54, a plurality of control actuators 36 and indicator 72. Operator's station 30, in the alternative, may be comprised of infrared communications link 62 in place of RF communications link 60 and antenna 54. Enclosure 70 of operator's station 30 is a small, lightweight and durable housing for infrared communications link 62 and control actuators 36. Although not shown, enclosure 70 would also include a cavity for use and storage of a battery to provide power to all associated electronic controls within operator's station 30. Enclosure 70 can be manufactured from numerous materials including inexpensive plastics but durable aluminum or steel with water-tight seals gaskets and control actuators is preferred. These precautionary measures will ensure safe and consistent operation in extreme environments which stump cutters are typically used.

Control actuators 36 of the preferred embodiment consist of the following: Power actuator 74 is a latching on/off switch which provides power from a battery or power supply (not shown) to the internal electronics of operator's station 30. Boom swing left actuator 76 and right actuator 78 allow the user to manipulate cutting boom 14, thereby moving cutting wheel 12 into different positions for operation. Two separate actuators 80 and 82 provide for on/off operation of the hydraulic transmission system of stump cutter 10. Although the preferred embodiment employs two separate switches, the on/off function could easily be combined into a single on/off actuator as is known in the art. In addition to being able to control right and left swing of cutting boom 14, actuators 88 and 90, respectively, control up and down movement of cutter wheel boom 14. Actuators 92 and 94 control outward and inward operation of the telescoping tongue of cutting boom 14 and actuators 96 and 98 control engine throttle, with 96 slowing the throttle and 98 increasing the throttle speed of the engine.

Enclosure 70 of operator's station 30 includes an area in which informational decals 100 may be placed to remind operator's of certain points and/or safety tips for operating stump cutter 10. Although described in detail, operator's station 30 is not to be limited to the specific embodiment described as one of ordinary skill in the art would recognize that many alternative embodiments of operator's station 30 which would comply with and allow the spirit of the invention to be implemented. Such further embodiments might include the use of joysticks to control functions such as cutter boom 14 location, the use of many different types of actuators such as proportional switches, variable resistors or any other type of electronic actuator capable of translating operator input into control signals. Additional features envisioned by Applicant, but not shown, include the use of electronic character displays such as LED and LCD alphanumeric displays which could be used to prompt the user for input, give feedback to the user on the operation, of stump cutter 10, provide safety tips and/or other general information to the operator.

Figure 7:
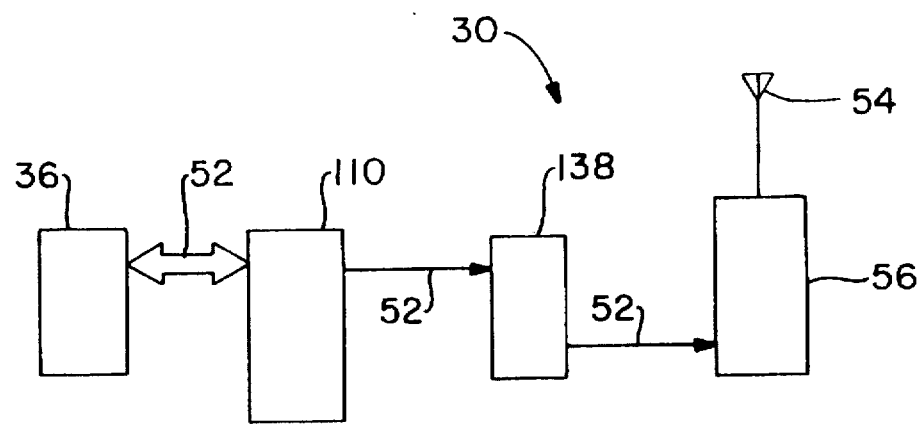
FIG. 7 is a simplified schematic diagram of the operator's station shown in FIG. 6.

FIG. 7 shows a simplified schematic diagram of the preferred embodiment of operator's station 30. Input from the user is translated into electrical signals by control actuators 36 which are then electrically coupled 52 to encoder 110. Encoder 110 translates the input information from control actuators 36 into specific electrical representations of the commands being issued by the operator. The electrical representations are then fed to digital-to-analog (D/A) converter 138. Once the signals have been converted to an analog format they are then coupled 52 to transmitter (transceiver) 56 which broadcasts the user's commands through antenna 54 for reception by stump cutter 10.

Figure 8:
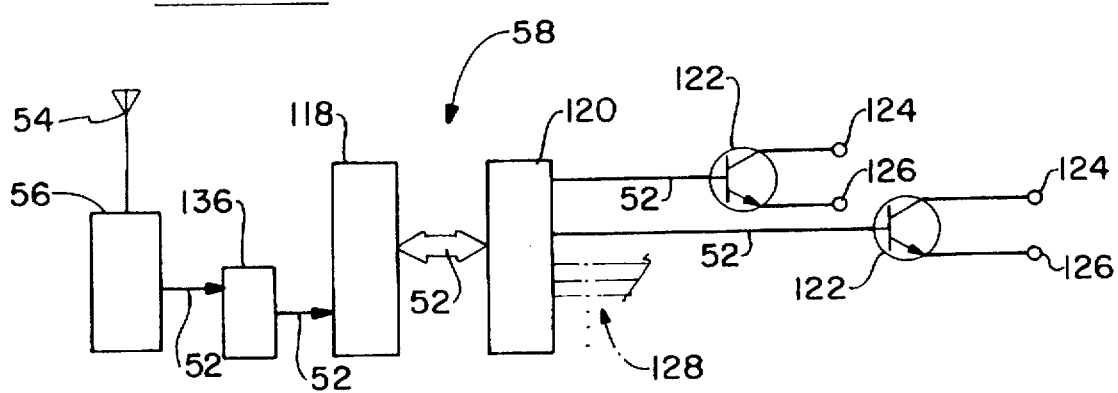
FIG. 8 is a simplified schematic diagram of a radio frequency (RF) transceiver (transmitter/receiver) in operable cooperation with the control system interface.

FIG. 8 shows control system interface 58 of the preferred embodiment in operable cooperation with radio frequency (RF) receiver 56 (transceiver). Control system interface 58 comprises encoder/decoder 118, driver 120 and a plurality of electronic switches which are implemented by transistors 122. In operation, control signals from operator's station 30 are received by antenna 54 and RF receiver 56. The received electrical signals are then coupled 52 to analog-to-digital (A/D) converter 136 thereby converting the analog information to a digital format which decoder 118 can manipulate. Decoder 118 translates the received commands to the appropriate format necessary for driver 120 to distinguish which electronic switch to control and the appropriate state of the same switch 122.

Electronic switches or transistors 122 have open terminals 124 and 126, respectively, representing the collector and emitter of transistors 122. These terminals are then interfaced in one of a plurality of methods, known in the art, to the hydraulic solenoid controls (not shown) of stump cutter 10. Depending upon the type of driver 120 chosen, it will be capable of driving a plurality of control signals 128 to handle as many functions of stump cutter 10 as are needed.

Figure 9:
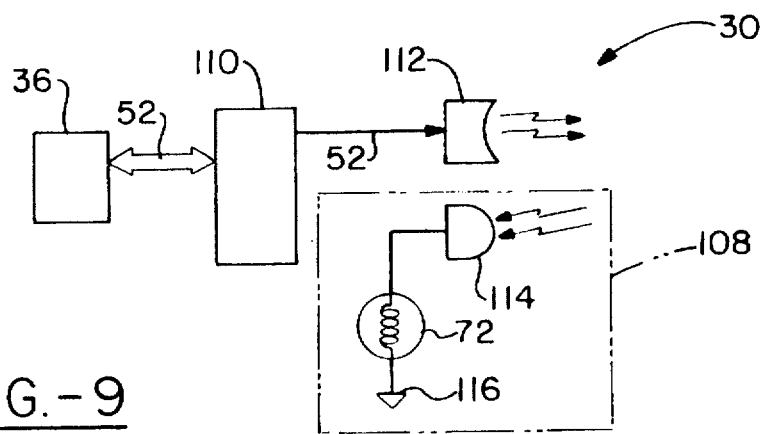
FIG. 9 is a simplified schematic diagram of an infrared (IR) alternative embodiment of the operator's station shown in FIG. 6.

FIG. 9 shows a simplified schematic diagram of an alternative embodiment of operator's station 30. Input from the operator is translated into electrical signals by control actuators 36 which are then electrically coupled 52 to encoder 110. Encoder 110 translates the input information from control actuators 36 into specific electrical representations of the commands being issued by the operator. The electrical representations or signals are then used to drive infrared emitter 112 causing infrared emitter 112 to output or emit infrared light corresponding to the signals sent to it by encoder 110. Operator's station 30 may also be equipped with optional circuit 108 which allows the operator to receive feedback from stump cutter 10. Feedback circuit 108 consists of infrared detector 114 which is electrically coupled to and drives indicator 72 whose circuit is then completed through ground 116. Feedback circuit 108 would be used with an alternative embodiment of stump cutter 10 whose control system interface 58 is configured to provide constant or intermittent infrared output signals to be detected by operator's station 30. These signals would indicate to the operator that he is within the line of sight or within the limited area in which the infrared communication medium will function. When infrared detector 114 receives intermittent or continuous feedback from stump cutter 10 it in turn drives indicator 72, which in this case is a type of light indicator but could also be any type of annunciator such as an audible alarm. This allows the operator to move around stump cutter 10 until indicator 72 is activated, making operation of stump cutter 10 simple and intuitive.

Figure 10:
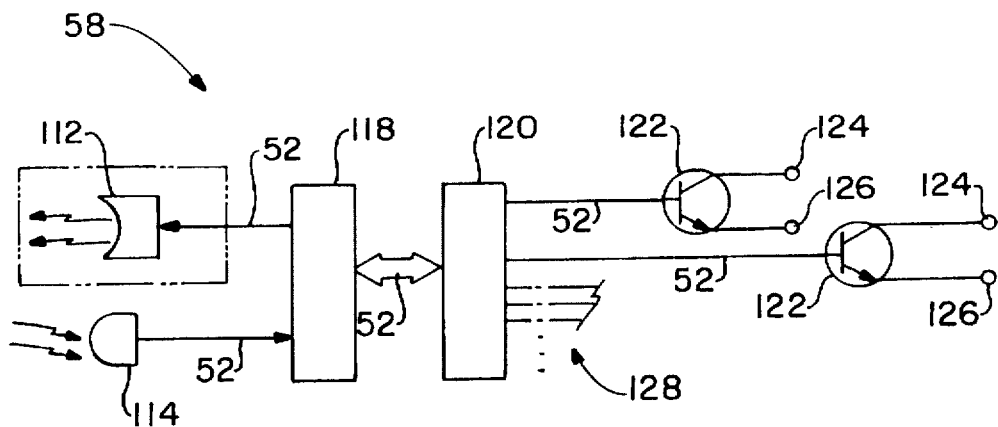
FIG. 10 is a simplified schematic diagram of an infrared (IR) transceiver (transmitter/receiver) in operable cooperation with the control system interface.

Control system interface 58, as shown in FIG. 10, comprises encoder/decoder 118, driver 120 and a plurality of electronic switches which are implemented by transistors 122. In operation, control signals from operator's station 30 are received by infrared detector 114 which translates the received infrared light information to electrical signals which are electrically coupled 52 to encoder/decoder 118. Decoder 118 translates the received commands to the appropriate format necessary for driver 120 to distinguish which electronic switch to control and the appropriate state of the same switch 122. The electronic switches or transistors 122 function similarly to that described for FIG. 8 and therefore will not be repeated. If the optional feedback circuit 108 is employed in operator's station 30, encoder 118 will also be coupled to infrared emitter 112 which is configured to provide electrical feedback to emitter 112. This feedback is then received by detector 114 of operator's station 30.

Figure 11:
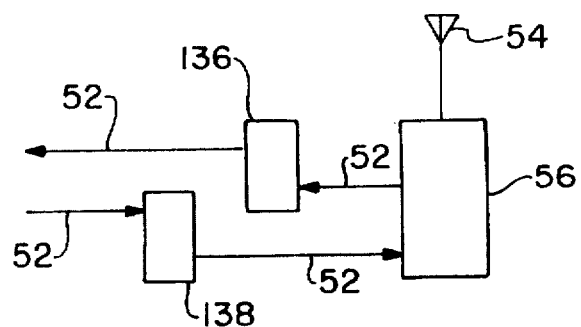
FIG. 11 is a simplified schematic diagram of a radio frequency (RF) transceiver (transmitter/receiver) and associated circuitry.

FIG. 11 shows a simplified schematic diagram of the circuitry needed to implement the radio frequency alternative embodiment of the invention, which would employ the same circuitry as shown in FIGS. 6 and 9 with the exclusion of infrared detector 112 and emitter 114. To transmit and/or receive information from and between operator's station 30 and stump cutter 10, radio frequency transceiver 56 which is electrically coupled to antenna 54, is employed. Although not shown, radio frequency transceiver 56 could also be represented by separate transmitters and receivers as one of ordinary skill in the art would recognize the interchangeability of these elements.

As the most common forms of radio frequency transmission are implemented in an analog format, radio frequency transceiver 56 is electrically coupled to both analog-to-digital (A/D) converter 136 and digital-to-analog (D/A) converter 138. When information is received by transceiver 56 the analog information is transferred to A/D converter 136 which translates the analog information into a digital format which is then coupled either to indicator 72, if used in conjunction with operator's station 30 or coupled to encoder/decoder 18, if used in conjunction with control system interface 58. When information is transmitted by transceiver 56 the information is received by D/A converter 138 from either encoder 110, if used in conjunction with operator's station 30 or encoder/decoder 118, if used in conjunction with control system interface 58. Once D/A converter 138 translates the information to an analog format it is then coupled to transceiver 56 and broadcast through antenna 54 by techniques well known in the art such as modulation with a high frequency carrier and power amplification.

Applicant has described several embodiments of the present invention which enable remote operation of stump cutter 10 thereby providing safety beyond that available in the current state of the art. While the embodiments described are preferred due to their simplicity, lower cost due to fewer components, and ease of operation. Applicant envisions advanced versions capable of more complete control, more detailed feedback to the operator of stump cutter 10 functions and other features such as data acquisition and logging, all of which are implemented today through advanced microprocessor and microcontroller technology.

Figure 12:
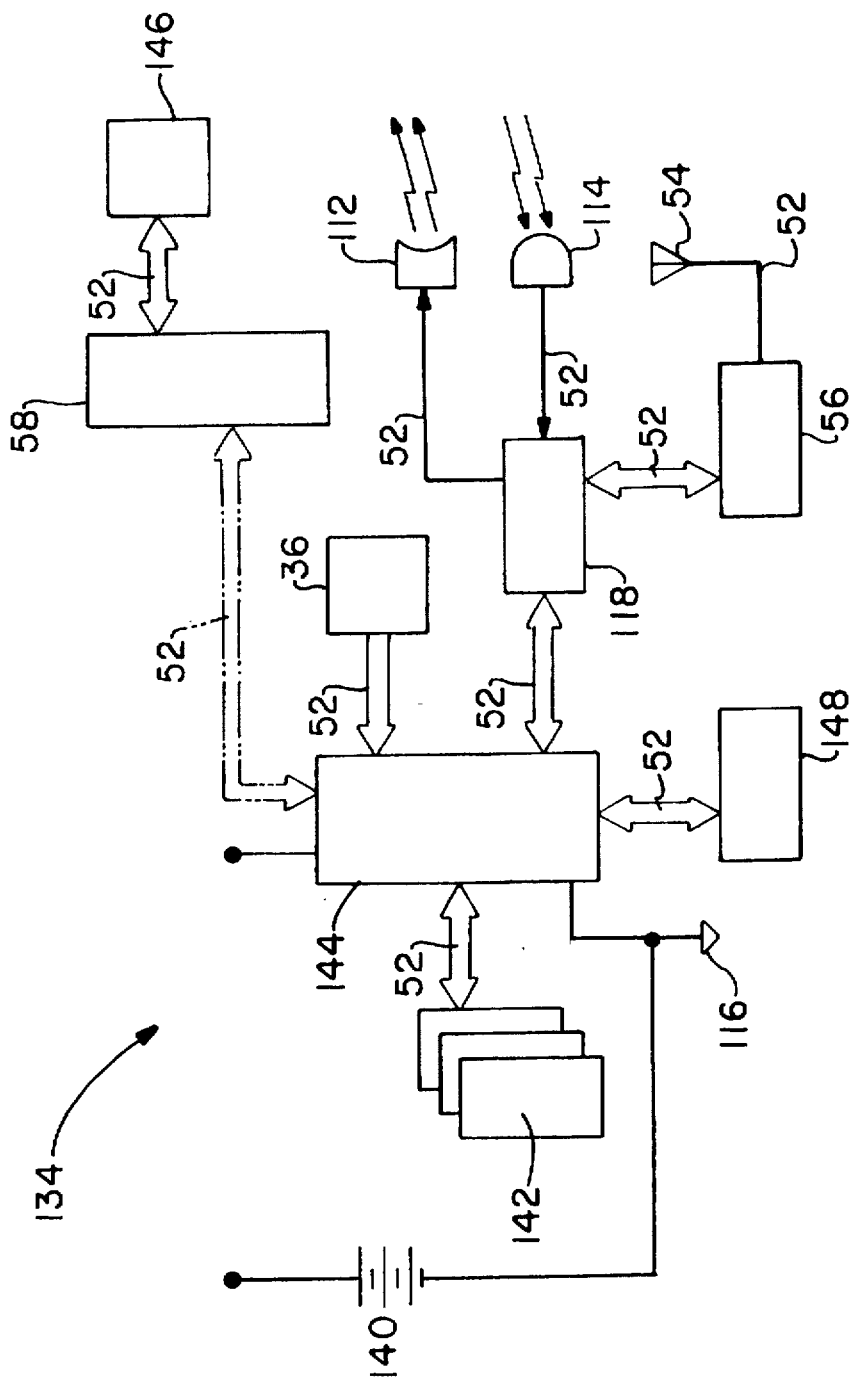
FIG. 12 is a simplified schematic diagram of a microprocessor controlled alternative embodiment of the invention.

FIG. 12 shows such an advanced system in simplified schematic form as computer control system 134, which could be used as both control system interface 58 and operator's station 30. This more advanced type of control is centered about microprocessor or microcontroller 144 and can be any type that is capable of handling input, output, and common logic functions with examples being the Intel 8031 family, 8086 family, the Motorola 68HC05 or 68HC11. Microcontroller 144 is electrically coupled 52 to memory 142. Memory 142 may be composed of RAM, EPROM, E$^2$PROM, Flash and/or any combination thereof including other types of memory not mentioned. The types of memory may even be embedded within microcontroller 144. Program memory is used to instruct microcontroller 144 on the functions to perform. Other uses for memory include scratch pad memory where temporary calculations may be made and volatile set points or data can stored. Microcontroller 144 is also electrically coupled 52 to display 148 which can be of any type including seven segment LED and Alpha-numeric LCD, to name a few.

If computer control system 134 is used for operator's station 30, display 148 would provide the operator feedback regarding the communications link, operating functions of stump cutter 10, diagnostic messages for stump cutter 10, and other types of information such as warnings. Although not as critical if computer control system 134 is used in conjunction with stump cutter 10, the same information could be displayed and might be useful if one operator was to monitor stump cutter 10 while another operator monitors stump cutter 10 from operator's station 30. Control actuators 36 are also coupled to microcontroller 114 for receiving operator input and instructions. Information is sent and received between operator's station 30 and stump cutter 10 through infrared emitter 112 and detector 114 which are both coupled to encoder/decoder 118 which in turn is coupled to microcontroller 144. As described earlier, RF transceiver 56 in conjunction with antenna 54 may be used in place of infrared emitter 112 and infrared detector 114 through encoder/decoder 118 if a radio frequency medium is preferred. When embedded computer control system 134 is used in conjunction with stump cutter 10, microcontroller 144 will be electrically coupled 52 to control system interface 58 of stump cutter 10 with control system interface 58 in turn being electrically coupled to the stump cutter solenoid hydraulic controls 146 of stump cutter 10.

By implementing the electronic control systems of both stump cutter 10 and operator's station 30 with microprocessor technology, additional features and system flexibility can be provided by simply creating different software for computer control system 134. These additional features and flexibility would include data logging of stump cutter 10's, which would include diagnostic information such as oil level of the diesel power plant of stump cutter 10, diesel fuel levels, stump cutter 10 temperature levels and many other operational factors which if unnoticed could effect and possibly make unsafe the operations of stump cutter 10. Other types of feedback are also contemplated by the Applicant such as audio feedback through alarms, bells, buzzers, and other transducers which are able to get the operator's attention when necessary, as under unsafe conditions.

Applicant also contemplates other variations of the present invention, and in particular the use of multiple miniature operator's stations 30. Through the use of advanced microprocessor technology additional personnel working with the operator would be equipped with miniature transmitters, either radio frequency or infrared, which would continuously or intermittently broadcast identification information to control system interface 58 of stump cutter 10. By doing so, control system interface 58 can monitor and determine if additional personnel enter into danger zone 22 and could then cease and/or prevent any further operation of stump cutter 10 until the extra personnel are safely back within safety zone 20. These additional miniature operator's stations 30 ensure complete safety for all personnel working with stump cutter 10 thereby furthering spirit and objects of the present invention, safe operation of stump cutter 10 or similar types of apparatus.

While the invention has been described primarily with reference to a stump cutter, it is not meant to be limited for use with stump cutters, and may be used in conjunction with any machine that may cause flying debris, including, but not limited to, augers, drills, rock and concrete cutting machines, and other similar machines. Although the foregoing description has set forth the preferred embodiment of the invention in particular detail, it must be understood that numerous modifications, substitutions, and changes may be undertaken without departing from the true spirit and scope of the present invention as defined by the ensuing claims.

What is claimed is:

1. A wireless remote control system for a stump cutter comprising:
   an operator's station having a first wireless communications link;
   a control system interface coupled to said stump cutter;
   a second wireless communications link coupled to said control system interface; and
   at least one electro-mechanical transducer coupled to both said stump cutter and said control system interface;
   wherein said second wireless communications link receives commands from said operator's station via said first wireless communications link, said control system interface interprets said received commands and communicates with said at least one electro-mechanical transducer, wherein said at least one electro-mechanical transducer controls said stump cutter accordingly; and
   wherein said stump cutter may only be controlled by said operator's station when said operator's station is within a predefined zone of operation.

2. A wireless remote control system as recited in claim 1, wherein
   said first communication link includes a radio frequency transmitter for translating electrical signals representative of user commands into radio frequency signals for emission; and
   said second communication link includes at least one radio frequency receiver for translating radio frequency signals into electrical signals representative of user commands.

3. A wireless remote control system as recited in claim 2, wherein
   said first communication link further includes a radio frequency receiver for translating radio frequency signals representative of feedback from said stump cutter into electrical signals; and said second communication link further includes at least one radio frequency transmitter for translating electrical signals representative of feedback from said stump cutter into radio frequency signals for emission.

4. A wireless remote control system as recited in claim 1, wherein said first and second wireless communication links utilize a communications medium selected from the group consisting of subsonic frequency, ultrasonic frequency, microwave frequency and laser frequency.

5. A wireless remote control system as recited in claim 2, wherein said operator's station further comprises:
   at least one actuator for user input;
   an encoder, having an input and an output, said at least one actuator coupled to said encoder input; and
   said encoder output is coupled to said first wireless communication link;
   wherein said encoder translates user input from said at least one actuator into appropriate signals for transmission by said first wireless communication link.

6. A wireless remote control system as recited in claim 2, wherein said control system interface:
   determines and monitors the strength of said radio frequency signals received by said second communication link;
   calculates the users distance from said stump cutter, as represented by the distance between said first communication link and said second communication link, based upon said radio frequency signal strength; and
   prevents operation of said stump cutter if said user is not within a predetermined minimum and maximum distance from said stump cutter.

7. A wireless remote control system as recited in claim 2, wherein said first communication link emits radio frequency signals representative of feedback which are received by said second communication link; and
   wherein said control system interface determines and monitors the strength of said radio frequency signals received by said second communication link;
   calculates the users distance from said stump cutter based upon said radio frequency signal strength; and
   prevents operation of said stump cutter if said user is not within a predetermined minimum and maximum distance from said stump cutter.

8. A wireless remote control system as recited in claim 3, wherein said second communication link emits radio frequency signals representative of feedback which are received by said first communication link;
   wherein in response to feedback received from said second communication link, said operator's station emits radio frequency signals acknowledging receipt of said feedback from said second communication link;

wherein said control system interface allows said stump cutter to function as long as said radio frequency signal acknowledgment is received from said operator's station.

9. A wireless remote control system as recited in claim 3, wherein said control system interface:

determines and monitors the strength of said radio frequency signals representative of user commands and feedback received by said second communication link;

calculates the users distance from said stump cutter based upon said radio frequency signal strength; and prevents operation of said stump cutter if said user is not within a predetermined minimum and maximum distance from said stump cutter.

10. A wireless remote control system as recited in claim 6 or 7, wherein said stump cutter remains inoperable after said operator's station surpasses said predetermined minimum and maximum distances until said operator's station is returned to within said predetermined minimum and maximum distances and said user manually restarts said stump cutter.

11. A wireless remote control system as recited in claim 1, wherein said first communication link includes an infrared emitter for translating electrical signals representative of user commands into infrared light for emission; and said second communication link includes at least one infrared detector for translating infrared light representative of user commands into electrical signals.

12. A wireless remote control system as recited in claim 11, wherein said operator's station further comprises:

at least one actuator for user input;

an encoder, having an input and an output, said at least one actuator coupled to said encoder input; and said encoder output is coupled to said first wireless communication link;

wherein said encoder translates user input from said at least one actuator into appropriate signals for transmission by said first wireless communication link.

13. A wireless remote control system as recited in claim 11, wherein said first communication link further includes an infrared detector for translating infrared light representative of feedback from said stump cutter into electrical signals; and said second communication link further includes at least one infrared emitter for translating electrical signals representative of feedback from said stump cutter into infrared light for emission.

14. A wireless remote control system as recited in claim 11, wherein said at least one infrared detector of said second communication link is coupled to said stump cutter in a predetermined position which prevents communication with said stump cutter by said operator's station unless said operator's station is within a predetermined safety area in relation to said stump cutter.

15. A wireless remote control system as recited in claim 14, wherein said stump cutter will cease current operation upon said operator's station being moved by the user out of said predetermined safety area in relation to said stump cutter.

16. A wireless remote control system as recited in claim 15, wherein said predetermined position of said at least one infrared detector limits the angle of reception of said at least one infrared detector, said angle of reception creating a boundary between an area in which communication between said first and second communication links functions and an area in which communication between said first and second communication links does not function.

17. A wireless remote control system as recited in claim 11, wherein said second communication link comprises at least two infrared detectors coupled to said stump cutter in predetermined positions, said predetermined positions of said at least two infrared detectors limit the angles of reception of said at least two infrared detectors creating a boundary on either side of said stump cutter which prevents said stump cutter from operating if said operator's station comes within a predetermined danger area about said stump cutter.

18. A wireless remote control system as recited in claim 11, wherein said second communication link further comprises:

at least one danger zone infrared detector coupled to said stump cutter in a predetermined position which only allows communication with said operator's station from within a predetermined danger area about said stump cutter;

wherein said at least one danger zone infrared detector is coupled to said control system interface; and said control system interface determines and monitors the strength of the infrared signals received by said at least one danger zone infrared detector which allows said control system interface to determine the users distance from said stump cutter while within said predetermined danger area about said stump cutter;

said control system interface upon determining the user is at a safe distance from said stump cutter while within said predetermined danger area about said stump cutter, said control system interface will allow said stump cutter to operate.

19. A wireless remote control system as recited in claim 2, further comprising, a radio frequency shield coupled to said stump cutter in an orientation which creates a predetermined danger area, said radio frequency shield prevents said second communication link from receiving user commands transmitted by said first communication link when said operator's station is within said predetermined danger area.

20. A wireless remote control system as recited in claim 19, wherein said second communication link further comprises:

at least one danger zone radio frequency receiver physically coupled to said stump cutter in a predetermined position which only allows communication with said operator's station from within a predetermined danger area about said stump cutter;

wherein said at least one danger zone radio frequency receiver is coupled to said control system interface; and said control system interface determines and monitors the strength of the radio frequency signals received by said at least one danger zone radio frequency receiver which allows said control system interface to determine the users distance from said stump cutter while within said predetermined danger area about said stump cutter;

said control system interface upon determining the user is at a safe distance from said stump cutter while within said predetermined danger area about said stump cutter, said control system interface will allow said stump cutter to operate.

21. A wireless remote control system as recited in claim 1, further including at least one miniature operator's station having a first wireless communications link for use by additional personnel working about said stump cutter wherein said control system interface via said second wireless communication link detects and monitors the position of users about said stump cutter.

22. A wireless remote control system as recited in claim 2 or 11, wherein said first wireless communication link and said second wireless communication link further include:
- a microprocessor for controlling and monitoring communications;
- a memory bank coupled to said microprocessor for instructions and data, wherein said microprocessor reads said instructions and said microprocessor uses and manipulates said data;
- an operator input transducer coupled to said microprocessor, wherein said microprocessor receives commands from the operator that are entered into said operator input transducer;
- a display coupled to said microprocessor, wherein said display provides information for the operator from said microprocessor;
- an encoder/decoder coupled to said microprocessor, wherein said encoder/decoder translates data to and from said microprocessor into an appropriate form for use by said first and second wireless communication links; and
- a power source coupled to said microprocessor, said memory bank, said display, and said encoder/decoder.

23. A wireless remote control stump cutter comprising: an operator's station having a first wireless communications link;

a stump cutter;

a control system interface coupled to said stump cutter;

a second wireless communications link coupled to said control system interface; and at least one electro-mechanical transducer coupled to both said stump cutter and said control system interface;

said second wireless communications link receives commands from said operator's station via said first wireless communications link, said control system interface interprets said received commands and communicates with said at least one electro-mechanical transducer, wherein said at least one electro-mechanical transducer controls said stump cutter accordingly.

* * * * *